US008966420B2

(12) United States Patent
Bansal et al.

(10) Patent No.: US 8,966,420 B2
(45) Date of Patent: Feb. 24, 2015

(54) ESTIMATING DELAY DETERIORATION DUE TO DEVICE DEGRADATION IN INTEGRATED CIRCUITS

(75) Inventors: Aditya Bansal, White Plains, NY (US); Jae-Joon Kim, Yorktown Heights, NJ (US); Rahul M. Rao, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/611,261

(22) Filed: Sep. 12, 2012

(65) Prior Publication Data

US 2013/0254731 A1    Sep. 26, 2013

Related U.S. Application Data

(63) Continuation of application No. 13/428,571, filed on Mar. 23, 2012.

(51) Int. Cl.
*G06F 17/50* (2006.01)
(52) U.S. Cl.
USPC ............ 716/113; 716/111; 716/116; 716/136
(58) Field of Classification Search
CPC ................................. G06F 17/50; G06F 9/455
USPC .............................. 716/111, 113, 136; 703/14
See application file for complete search history.

(56) References Cited

U.S. PATENT DOCUMENTS

| 5,880,967 | A | 3/1999 | Jyu et al. |
| 6,047,247 | A | 4/2000 | Iwanishi et al. |
| 6,762,966 | B1 | 7/2004 | Larosa et al. |
| 7,567,891 | B1 | 7/2009 | Liu et al. |
| 8,176,454 | B2 * | 5/2012 | Potkonjak ................. 716/108 |
| 8,181,144 | B2 * | 5/2012 | Tetelbaum ................ 716/134 |
| 2011/0313735 | A1 | 12/2011 | Lo et al. |

OTHER PUBLICATIONS

Chen, J., et al. "Statistical Variation of NMOSFET Hot-Carrier Lifetime and Its Impact on Digital Circuit Reliability" International Electron Devices Meeting. Dec. 1995. pp. 29-32.
Glosekotter, P., et al. "Device Degradation and Resilient Computing" International Symposium on Circuits and Systems (ISCAS 2008). May 2008. pp. 828-831.

(Continued)

*Primary Examiner* — Thuan Do
(74) *Attorney, Agent, or Firm* — Tutunjian & Bitetto, P.C.; Preston J. Young (57) ABSTRACT

A method for estimating delay deterioration in an integrated circuit comprising estimating degradation in at least one characteristic of each device defined within the integrated circuit using voltages and logic values monitored during a simulation of the digital circuit. Generating an end-of-life netlist in which the at least one device characteristic of each device has been modified to reflect the estimated degradation or estimating a change in timing delay of each device directly from the estimated degradation of the at least one characteristic of each device. A timing analysis is performed using the estimated change in timing delay of each device to determine circuit path delays. The timing analysis is static or statistical.

10 Claims, 5 Drawing Sheets

(56) References Cited

OTHER PUBLICATIONS

Kang, K., et al. "NBTI Induced Performance Degradation in Logic and Memory Circuits: How Effectively Can We Approach a Reliability Solution?" Proceedings of the 13th Asia South Pacific Design Automation Conference, ASP-DAC 2008. Jan. 2008. pp. 726-731.

Liu, Z., et al. "Design Tools for Reliability Analysis" Proceedings of the 43rd Design Automation Conference, DAC 2006. Jul. 2006. pp. 182-187.

Orshansky, M., et al. "A General Probabilistic Framework for Worst Case Timing Analysis" Proceedings of the 39th Design Automation Conference, DAC 2002. Jun. 2002. pp. 556-561.

Tsai, C., et al. "An Interconnect Insensitive Linear Time-Varying Driver Model for Static Timing Analysis" 6th International Symposium on Quality of Electronic Design (ISQED 2005), Computer Society 2005. Mar. 2005. (8 Pages).

* cited by examiner

ESTIMATING DELAY DETERIORATION DUE TO DEVICE DEGRADATION IN INTEGRATED CIRCUITS

RELATED APPLICATION DATA

This application is a Continuation application of co-pending U.S. patent application Ser. No. 13/428,571 filed on Mar. 23, 2012, incorporated herein by reference in its entirety.

BACKGROUND

1. Technical Field

The present invention relates to the reliability of integrated circuits, and more particularly to a method for estimating delay deterioration in integrated circuits due to device degradation.

2. Description of the Related Art

Very large scale integration (VLSI) circuits are designed and manufactured using imperfect processes and numerous tests must be run to check the functionality of a VLSI circuit. Such circuits degrade with use over time due to known and predictable effects such as bias temperature instability (BTI) and hot carrier injection (HCI). As a result, manufactured VLSI circuits are more likely to fail in the field, even though they have successfully passed numerous functional and verification tests prior to shipping.

The degradation of individual devices within a VLSI circuit may manifest itself as a change from nominal values established at the time production in one or more characteristics of a device. As an example, degradation may manifest itself as a change from the nominal value of a device's threshold-voltage or mobility.

A precise estimate of degradation in a VLSI circuit is nearly impossible due to such factors as highly complex designs, variations in manufacturing processes, multiple operating environments and approximations made during the modeling of these circuits. An over-estimation of a device's degradation may not take into account that device's ability to recover from the effects HCI and BTI degradation or that device's higher slope times which may compensate for degradation. As a result, excessive guardbands may be applied and good dies on which VLSI circuits may be formed are wasted. On the other hand, an under-estimation of a device's degradation may result in not fully testing certain critical pathways within a circuit. As a result, the eventual degradation of devices within a packaged integrated circuit may actually occur at a customer location even though the device passed functional and verification tests prior to shipping.

SUMMARY

In accordance with the present principles, a method for estimating delay deterioration in an integrated circuit includes estimating static or statistical degradation over each of one or more lifetimes in at least one characteristic of each device defined within the integrated circuit using voltages and logic values monitored during a simulation of the integrated circuit, estimating a static or statistical change in timing delay for each of the one or more lifetimes of each device directly from each of the estimated degradations of the at least one characteristic of each device and performing a static or statistical timing analysis for each of the estimated changes in timing delay to determine static to statistical circuit path delays over each of the one or more lifetimes.

In accordance with the present principles, a method for estimating delay deterioration in an integrated circuit includes estimating a static or statistical degradation over each of one or more lifetimes in at least one characteristic of each device defined within the integrated circuit using voltages and logic values monitored during a simulation of the integrated circuit, generating an end-of-life netlist for each of the one or more lifetimes in which the at least one device characteristic of each device has been modified to reflect each of the estimated degradations and performing a static or statistical timing analysis for each of the end-of-life netlists to determine static or statistical circuit path delays over each of the one or more lifetimes.

In accordance with the present principles, a system for estimating delay deterioration in an integrated circuit includes a degradation estimator for estimating static or statistical degradation over each of one or more lifetimes in at least one characteristic of each device within the integrated circuit using voltages and logic values monitored during a simulation of the integrated circuit, a timing delay estimator for estimating static or statistical change in timing delays for each of the one or more lifetimes of each device directly from each of the estimated degradations of the at least one characteristic of each device and a timing analyzer for performing a static or statistical timing analysis for each of the estimated changes in timing delay to determine static or statistical circuit path delays over each of the one or more lifetimes.

In accordance with the present principles, a system for estimating delay deterioration in an integrated circuit includes a degradation estimator for estimating static or statistical degradation for each of one or more lifetimes in at least one characteristic of each device defined within the integrated circuit using voltages and logic values monitored during a simulation of the integrated circuit, a netlist generator for generating an end-of-life netlist for each of the one or more lifetimes in which the at least one device characteristic of each device has been modified to reflect each of the estimated degradations and a timing analyzer for performing a static or statistical timing analysis on each of the end-of-life netlists to determine static or statistical circuit path delays over the one or more lifetimes.

In accordance with the present principles, a computer readable storage medium comprising a computer readable program for estimating delay deterioration in an integrated circuit, wherein the computer readable program when executed on a computer causes the computer to perform the steps of estimating static or statistical degradation over each of one or more lifetimes in at least one characteristic of each device defined within the integrated circuit using voltages and logic values monitored during a simulation of the integrated circuit, estimating static or statistical change in timing delay for each of the one or more lifetimes of each device directly from each of the estimated degradations of the at least one characteristic of each device and performing static or statistical timing analysis for each of the estimated changes in timing delay to determine static to statistical circuit path delays over each of the one or more lifetimes.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

According to the embodiments of the present principles, a method and system are provided for estimating the extent of degradation in a device at different lifetimes and translating that estimate into a change in circuit performance and shipping frequency. The methods include exercising a circuit using either a specific pattern or a random pattern representative of a workload to be seen by the circuit, performing a simulation to estimate circuit activity and evaluating the possible degradation in the various devices within the circuit at different lifetimes. As a further feature of the embodiments of the present principles, the method provides for utilizing static and statistical timing analysis to evaluate circuit path delays resulting from degradation.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions Referring now to the drawings in which like numerals represent the same or similar elements and initially to FIG. 1, a block/flow diagram is illustrated of a diagram of a system/method for determining the impact of aging on timing performance for one or more lifetimes in integrated circuits according to the embodiments of the present principles. In block 110, a first timing analysis of a defined circuit is performed. The timing analysis establishes circuit path delays at the design phase of the defined circuit using nominal values for characteristics of each device within the defined circuit.

Figure 1:
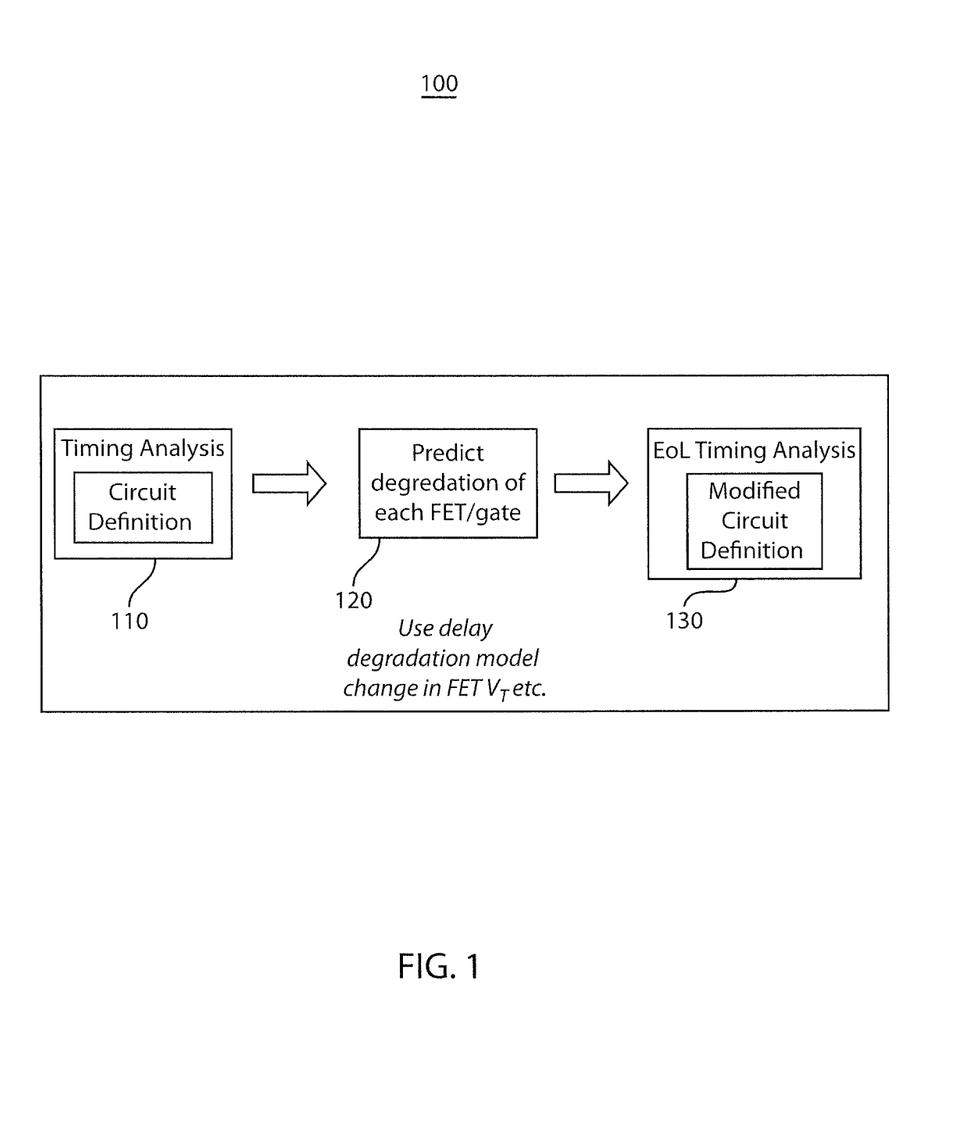
FIG. 1 is a block/flow diagram of a system/method for determining the impact of aging on timing performance for one or more lifetimes in integrated circuits according to the embodiments of the present principles.

In block 120, degradation of a device within the defined circuit is predicted. Degradation may be represented as a change in one or more characteristics of a device from their nominal values resulting from use over time. One such characteristic (e.g.) is the threshold-voltage of a device. Threshold-voltage is a voltage level at which an event occurs within a device such as the formation of a channel within a field effect transistor (FET).

A functional expression for a change in threshold-voltage can be expressed as $$\Delta VT = f(V_{dd}, T, t_{on}, t_{off}, s),$$

where $V_{dd}$ is the operating voltage, T is the operating temperature, $t_{on}$ and $t_{off}$ are the on and off duration times and s is the transition slew. Degradation models, such as a BTI and HCI models, based on a change in threshold-voltage may be generated using this functional expression. These models may reflect operating conditions and activity profiles of a device. Furthermore, these models may be used to calculate a change in threshold-voltage at different lifetimes.

In order to predict degradation, the circuit definition is simulated using a specific pattern and the voltages and logic values at the nodes of each device are monitored at each tine instant during the timespan of the simulation. The specific pattern is generated to reflect a workload that is to be seen by the integrated circuit under expected operating conditions. The information derived from the monitored voltages and logic values is then used in conjunction with a degradation model to predict degradation over one or more lifetimes of an integrated circuit. Once device degradation has been determined for a specified lifetime, an amended circuit definition including the predicted degradation is generated for that specified lifetime. As an example, a change in a device's threshold-voltage as a result of degradation at a specified lifetime is incorporated into a modified netlist for that specified lifetime. A separate modified circuit definition is generated for each specified lifetime.

In block 130, a second timing analysis is performed on each of the modified circuit definitions. These timing analyses determine changes in circuit path delays resulting from degradation for each of the lifetimes.

A timing analysis in the embodiments of the present principles may be static or statistical. A static timing analysis is performed using device characteristics represented as single fixed-point values and provides a deterministic single fixed-point value for corresponding circuit path delays. However, a static timing analysis does not take into account either variations due to imperfect manufacturing processes or variations in the operating environment to which an integrated circuit may be exposed. To take these variations into account, the embodiments of the present principles also implement a timing analysis that is statistical. A statistical timing analysis replaces static deterministic circuit path timing for a single device with a probability distribution of timings for the single device. As such, a statistical timing analysis is based on device characteristics presented as a distribution of possible values. As an example, a device's threshold-voltage may be presented as a distribution of values for that device (e.g. a histogram). A person of ordinary skill in the art will note that other device characteristics, other than threshold-voltage, may be used to estimate degradation including, but limited to, mobility.

Figure 2:
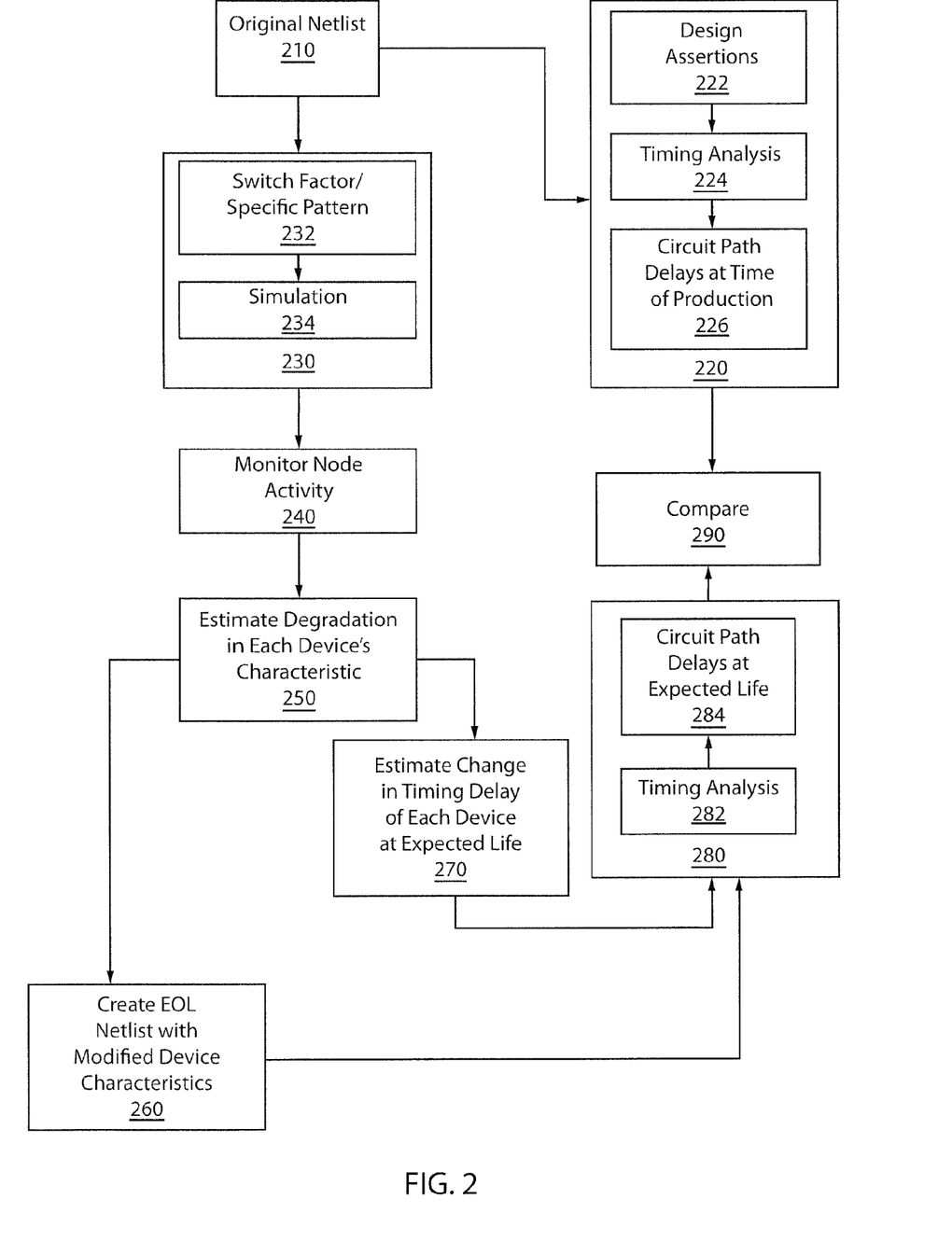
FIG. 2 is a block/flow diagram of a system/method for estimating delay deterioration for one or more lifetimes in integrated circuits due to degradation according to the embodiments of the present principles.

Referring now to FIG. 2, a block/flow diagram illustrates a system/method for estimating delay deterioration for one or more lifetimes in integrated circuits due to degradation according to the embodiments of the present principles. In block 210, an original netlist defining an integrated circuit is provided. A netlist file describes the devices included in a circuit that is to be simulated and provides a definition for each of these devices. The devices defined within the original netlist may include both analog and digital devices. The definition of these devices includes a listing of possible connections and the properties of each defined device. These connections and properties are specific to the type of device defined. Instances of each type of defined device are created and connections between instances are defined to form an integrated circuit that is to be simulated. Once created, the netlist is read by a simulation program which simulates the described integrated circuit.

In block 220, a first timing analysis is performed on the original netlist. In block 222, nominal values for the characteristics of each device as asserted during the design phase of the circuit are provided to the first timing analysis. These assertions are made to set the needed signal arrival times at the outputs of the defined circuit. The device characteristics may include, but are not limited to, threshold-voltage. In block 224, the first timing analysis is performed using the asserted nominal characteristics of each device. In block 226, the first timing analysis determines nominal circuit path delays at the time of production.

The first timing analysis may be static or statistical. A static timing analysis operates on asserted device characteristics presented as single fixed-point values and provides nominal circuit path delays presented as single fixed-point values.

A statistical timing analysis operates on asserted device characteristics presented as a distribution of nominal values for each device, these values representing, as an example but not limited to, samples across a plurality of manufactured circuits or a plurality of operating conditions. The statistical timing analysis provides nominal circuit path delays presented as a distribution of values for each device.

In block 230, a simulation of the original netlist is performed. In block 232, a specific or random pattern representing a workload to be seen by the integrated circuit is generated. A person of ordinary skill in the art will note that there are several known methods for generating a specific pattern that represent a workload to be seen by a circuit under a defined operating environment. In block 234, the simulation is performed on the original netlist using the generated pattern. This simulation can be a switch based simulation that provides for measurement of voltages and logic values at the nodes of each device during the simulation. As such, this simulation does not need to have the added overhead of a timing analysis which is required to determine actual circuit path delays.

In block 240, the voltages and logical values at the nodes of each device are monitored at every time instant throughout the timespan of the simulation. These monitored voltage and logic values are used to derive such information as on and off duration times and transition slew of the monitored device. This information then used in conjunction with a degradation model to estimate a change in that device's threshold-voltage over one or more lifetimes.

In block 250, the degradation of a characteristic in a device is estimated based on the monitored voltages and logical values. As described above, a model may represent degradation as a change in a device's threshold voltage ($\Delta VT$) as a function of operating voltage ($V_{dd}$), operating temperature (T), on and off duration times ($t_{on}$ and $t_{off}$) and transition slew (s) over a plurality of lifetimes. As such, the voltages and logic values monitored during the simulation are used in conjunction with a degradation model to calculate changes in a device characteristic representative of degradation at a specific lifetime. Furthermore, a device's degradation calculated at a specific lifetime may then be used to calculate a device's degradation at other lifetimes.

The calculated change in a device characteristic can be represented either as a static single-point value or as a distribution of values depending on the type of timing analysis that is to be performed. For a static timing analysis, the degradation is mapped as a fixed single-point offset from a nominal value for one or more of device characteristics. As an example, the calculated offset in the threshold-voltage of a device is presented as a fixed single-point value ($\Delta V_{th}$) for each device. For a statistical timing analysis, the degradation is mapped as a distribution specified, for example, by a mean, a standard deviation and a distribution type for each device. As an example, the calculated offset in the threshold-voltage of a device is presented as a distribution of values ($\delta V_{th}$) for that device.

In block 260, an end-of-life netlist is created reflecting the estimated degradation of each device within the netlist over a specific lifetime. In other words, in the end-of-life netlist, the characteristics of each device are modified from their nominal values to reflect an estimated change in a characteristic as a result of degradation over a specific lifetime. A separate end-of-life netlist is generated for each lifetime.

In block 280, a second timing analysis is performed. In block 282, the second timing analysis is performed on each end-of-life netlist. In block 284, the second timing analysis determines circuit path delays for each lifetime defined by a corresponding end-of-life netlist. These circuit path delays correspond to the modified characteristics of each device reflecting the estimated degradation over a specified lifetime. The second timing analysis is usually done in a similar manner as the first timing analysis and, as such, may be static or statistical. However, unlike the first timing analysis, the second timing analysis is run one or more time, depending on the number of end-of-life netlist created covering one more specified circuit lifetimes.

As with the first timing analysis, a static second timing analysis operates on device characteristics presented as fixed single-point values and provides expected circuit path delays presented as fixed single-point values for each device. A statistical second timing analysis operates on device characteristics presented as a distribution of values and provides circuit path delays presented as a distribution of values for each device.

In block 290, the previously determined nominal circuit path delays are compared to the determined circuit path delays at a specified lifetime.

In another embodiment in accordance with the present principles, rather than generate an end-of-life netlist for each specified lifetime, a change in the delay timing of each device is estimated directly from an estimated degradation of a corresponding device.

Referring again to FIG. 2, in block 270, a change in the timing delay of each device is derived directly from the estimated degradation in a characteristic of each device. A timing delay for each device may be derived for each of device lifetime. This estimation may be derived using either multiple simulations, analytical equations or both.

In the case of simulations, the device under consideration may be simulated using a transistor level simulator, such as SPICE, under the device's specific input slew, load and operating conditions, to determine a change in timing delay due to the estimated degradation.

In the case of analytical equations, a change in the timing delay of a device is estimated by mapping the nominal timing delay of the device to the estimated degradation of that device. Specifically, an analytical equation defines a non-linear mapping of device timing delay to an estimated change in a device characteristic, such as threshold-voltage. The product of this mapping is a substantially accurate representation of the timing delay of a device resulting from an estimated degradation of the device. The mapping may be of fixed static values or of a distribution of values. As one of ordinary skill in the art will note, there exists a variety of relationships which may define this mapping.

In the case of fixed static values, a fixed static value representing the nominal delay of a device is mapped to a fixed single-point value representing the change in a characteristic of that device. The product of this non-linear mapping is a fixed static value representing the expected timing delay of the device after an estimated degradation has occurred.

In the case of a distribution of values, a distribution of values representing the nominal delay of a device is mapped to a distribution of values representing changes in a characteristic of the device. The product of this non-linear mapping is a distribution of values representing the expected timing delay of the device after degradation of that device has occurred during a defined lifetime.

In block 280, a second timing analysis is performed for each specified lifetime. In block 282, the original netlist is simulated and the delay of each circuit path is determined using the modified timing delay for those devices that have experienced degradation. Any part of the original netlist which has not experienced degradation does need not be simulated again. This second simulation is performed for each specified lifetime. In block 284, the second timing analysis determines circuit path delays over one or more specified lifetimes based on the modified timing delay of each device. As discussed above, the second timing analysis may be static or statistical.

Figure 3:
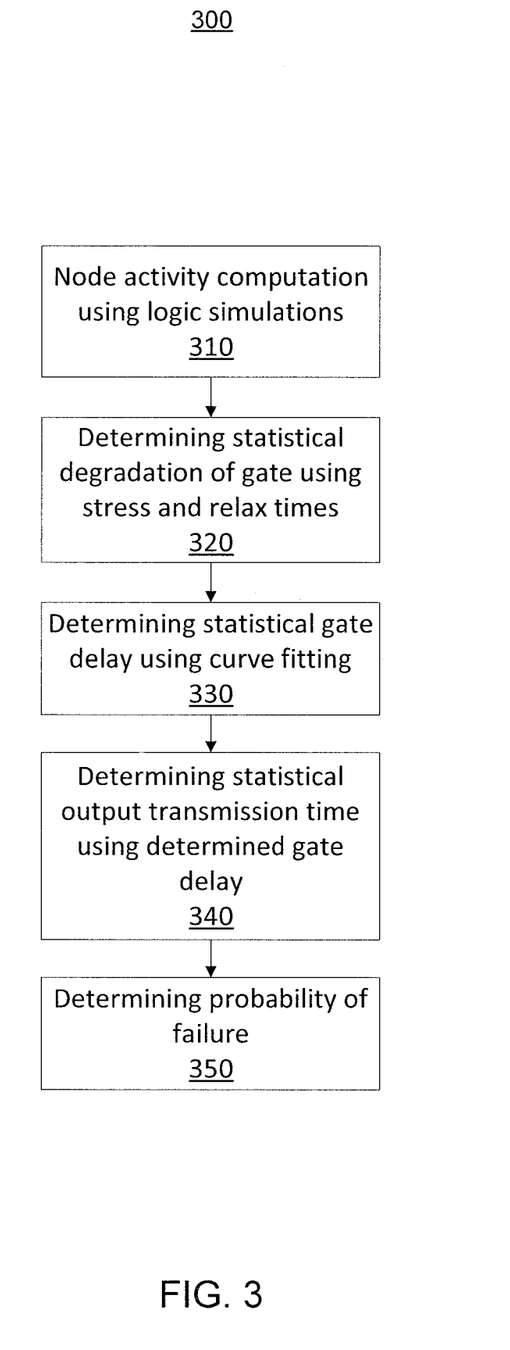
FIG. 3 is a block/flow diagram of a system/method demonstrating an end-of-life statistical timing analysis according to an embodiment of the present principles.

Referring now to FIG. 3, a block/flow diagram illustrates a system/method demonstrating an end-of-life statistical timing analysis according to an embodiment of the present principles. In block 310, voltages and logic values at the nodes of each device are monitored at every time instant throughout the timespan of a simulation of a circuit definition. The simulation uses a specific pattern representative of a workload to be seen by the integrated circuit defined by the circuit definition. In block 320, a change in the threshold-voltage of each device within the circuit definition is estimated based on the voltages and logic values monitored during the simulation. The estimated change in threshold-voltage is presented as a distribution of values. In block 330, a distribution of the device's nominal timing delays is mapped to the estimated distribution of values of changes to the threshold-voltage of that device. The product of this non-linear mapping is a distribution of values of timing delays of that device as a result of the estimated degradation in that device. In block 340, a distribution of values of the output transition time of the device is computed as a function of an input arrival time and the modified timing delays. In block 350, an expected failure probability of the integrated circuit is presented based on a distribution of circuit output times in combination with an expected lifetime and the expected operational frequency of the integrated circuit.

As an illustrative example of one possible implementation of the above-described embodiments, one possible model for degradation due to the effects of BTI only is $$\Delta V_T(t) = A V_{dd}^a T^b t_s^n / 1 + m\left(\frac{t_r}{t_s}\right)^n$$

which provides a change in threshold-voltage ($\Delta V_T$) as a function of operating voltage ($V_{dd}$), operating temperature (T), stress time ($t_s$) and relax time ($t_r$). The constants A, a, b, n and m are technology dependent and fitted using hardware measurements. This model represents degradation as a change in threshold voltage. However, a person of ordinary skill in the art will note that other models based on other device characteristics may be used to estimate degradation.

In this example, the original netlist is simulated for a period of 2 hours at an operating voltage of 1V and the device under question is operated at a frequency of 2 GHz and experiences an average temperature of 75 C. It is determined from the voltages and logic levels monitored at the nodes of the device in question that during the 2 hours period of the simulation this device experienced 30 minutes of stress time and 90 minutes of relax time. The determined 30 minutes of stress time and 90 minutes of relax time are then plugged into the degradation model and the change in threshold-voltage of the device in question for a lifetime of 2 hours is calculated. A change in threshold-voltage for each device within original netlist may be similarly calculated.

An end-of-life netlist corresponding to a lifetime of 2 hours is created in which the nominal threshold-voltage of each device that has experienced degradation is modified according to its calculated change in threshold-voltage ($\Delta V_T$).

A second timing analysis is then performed on the end-of-life netlist to determine circuit path delays over the 2 hour lifetime with an operating voltage of 1V and an operating frequency of 2 GHz.

Alternatively, a change in the nominal delay time of each device may be derived directly from the calculated change in threshold-voltage for that device. The change is delay timing may be directly derived by using an analytical equation to map the device's nominal timing delay to the device's calculated change in threshold-voltage. The derived change in timing delay for each device that has experienced degradation is applied to the original netlist. As second timing analysis is then performed on those paths within the original netlist which have experienced degradation to determine circuit path delays at the 2 hour lifetime at an operating voltage of 1V and an operating frequency of 2 GHz.

As another illustrative example of one possible implementation of the above-described embodiments, it is now desired to determine an end-of-life assessment of the defined circuit slated to run at an operating voltage of 1.2V and an operating frequency of 3.3 GHz for a lifetime of 4 years.

In one implementation, the stress time ($t_s$), relax time ($t_r$) and operating temperature (T) of the device in question may be directly calculated from the following relationships, $$t_s=(t_{s\_org}/t_{sim\_org})*\text{New\_Lifetime}*(1+k0*(f_{org}/f_{new})),$$

$$t_r=(t_{r\_org}/t_{sim\_org})*\text{New\_Lifetime}*(1+k0*(f_{org}/f_{new})),$$

$$T=T_{org}*(k2*V_{dd}\_\text{new}^a+k3*\exp(V_{dd})),$$

where $t_{s\_org}$ is the original stress time, $t_{r\_org}$ is the original relax time, $t_{sim\_org}$ is the original simulation timespan, $f_{org}$ is the original operating frequency, $f_{new}$ is the new operating frequency, $T_{org}$ is the original operating temperature and $V_{dd\_}$ new is the new operating voltage. Also, where a, k0, k2 and k3 are predetermined coefficients.

Therefore, the change in threshold-voltage ($\Delta V_T$) for the device in question is slated to run at an operating voltage of 1.2V and an operating frequency of 3.3 GHz for a lifetime of 4 years is calculated using our model based on the following variable, $$t_s=(30 \text{ min}/120 \text{ min})*4 \text{ years}*(1+k0*(2 \text{ GHz}/3.3 \text{ GHz}),$$

$$t_r=(90 \text{ min}/120 \text{ min})*4 \text{ years}*(1+k0*(2 \text{ GHz}/3.3 \text{ GHz}),$$

$$T=75 \text{ C}*(k2*1.2^a+k3*\exp(1.2)).$$

Once the change in threshold-voltage has been calculated, it may be used to generate another end-of-life netlist at the new lifetime and under the new operating conditions. As discussed above, the second timing is performed on the new end-of-life netlist to determine the circuit path delays at the new lifetime.

Alternatively, the change in the timing delay of each device that has experienced degradation is derived directly from the newly calculated change in threshold-voltage for the corresponding device. The second timing analysis is then performed on the original netlist using the newly derived changes in device timing delay.

Moreover, while in this illustrative example the second timing analysis was described as static, in the embodiments of the present principles the second timing analysis may be statistical.

Figure 4:
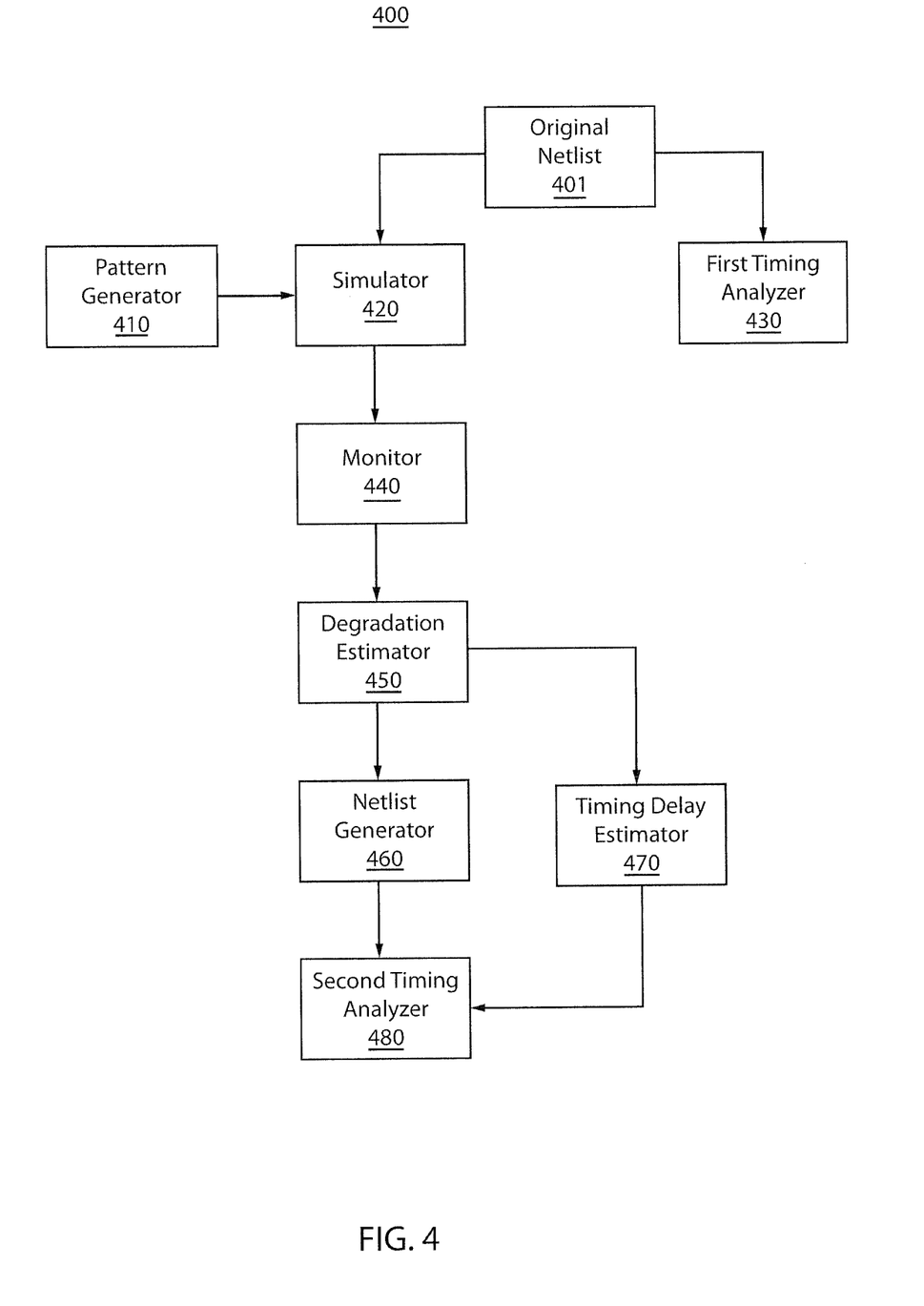
FIG. 4 is a block/flow diagram of a system/method for estimating delay deterioration for one or more lifetimes in integrated circuits due to device degradation according to the embodiments of the present principles.

Referring to FIG. 4, a block/flow diagram illustrates a system/method for estimating delay deterioration for one or more lifetimes in integrated circuits due to device degradation according to the embodiments of the present principles. In block 401 and original netlist that defines an integrated circuit is provided. In block 410, a pattern generator generates a specific pattern based on a workload to be seen by the integrated circuit. In block 420, a simulator simulates the original netlist. In block 430, a first timing analyzer generates a nominal timing delay for each device defined within the original netlist. The nominal timing delay of each device may be presented either as fixed static value or as a distribution of values. In block 440, a monitor monitors the voltages and logic values at the nodes of each device at every time instant during the timespan of the simulation. In block 450, a degradation estimator estimates the degradation of each device based on the voltages and logic values monitored during the simulation. The estimated degradation of each device may be presented either as a fixed static value for each device or as a distribution of values for each device. In block 460, a netlist generator generates an end-of-life netlist in which one or more characteristics of each device have been modified to reflect the estimated degradation of each device. The one or more modified device characteristics may be presented as either a fixed static value for each device or as a distribution of values for each device. In block 470, a timing delay estimator estimates a timing delay for each device directly from the estimated degradation of a corresponding device. The resulting timing delay for each device may be presented as either a fixed static value for each device or as a distribution of values for each device. The timing delay of each device is derived using either equation based fitting or multiple simulation calls or both. In block 480, a second timing analyzer determines circuit path delays based either on the end-of-life netlist generated by the netlist generator or the modified timing delays of each device. The resulting circuit path delays determined by the second timing analyzer may be presented either as a fixed static value for each circuit path or as a distribution of values for each circuit path.

A system for processing the methods of estimating delay deterioration in integrated circuits due to device degradation according to the embodiments of the present invention may be implemented using a variety of appropriate computing system.

Figure 5:
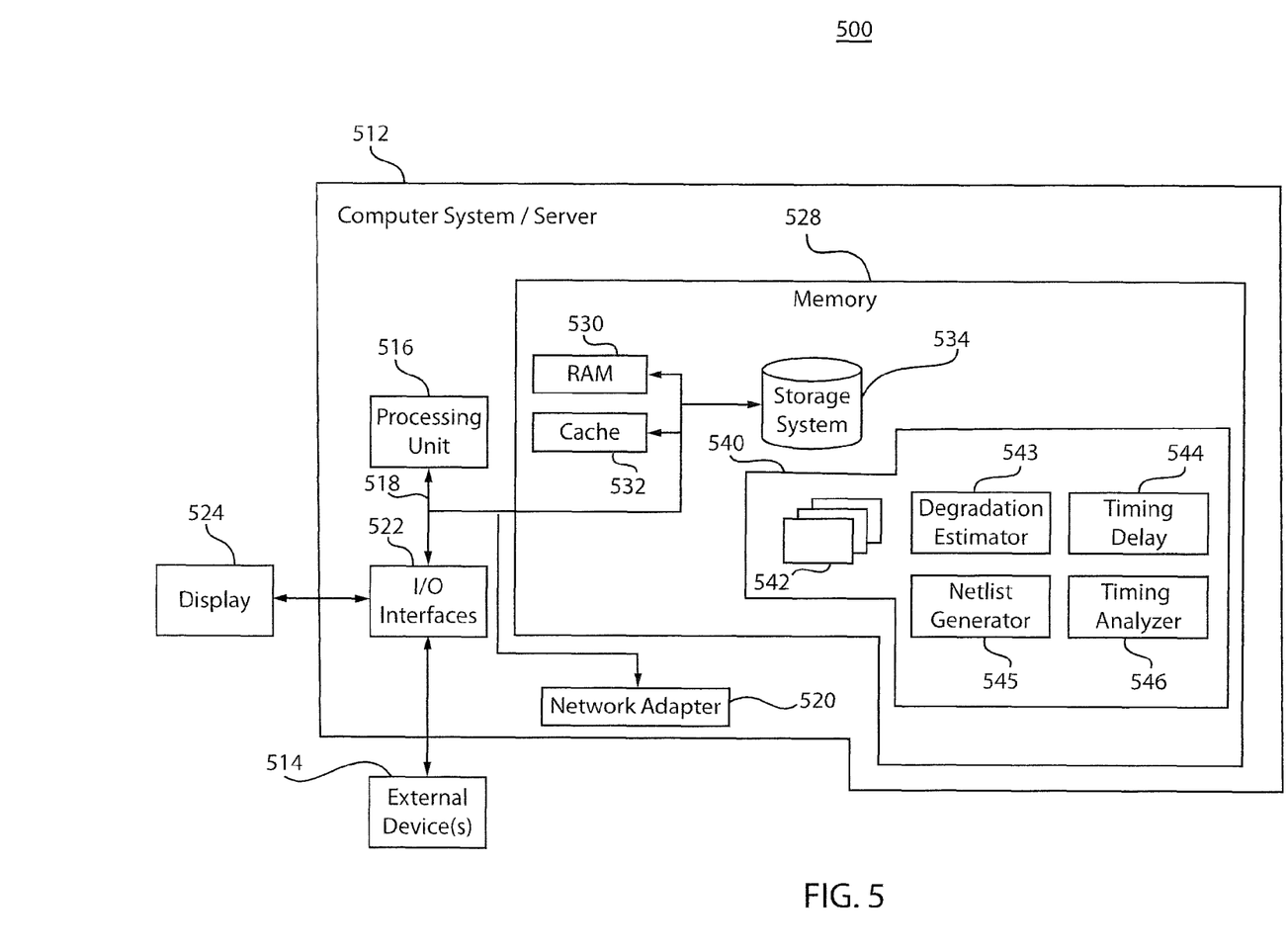
FIG. 5 illustrates a computing system for implementing the methods of estimating delay deterioration for one or more lifetimes in integrated circuits due to device degradation according to the embodiments of the present principles.

FIG. 5 illustrates a computer system for implementing the methods of estimating delay deterioration for one or more lifetimes in integrated circuits due to device degradation according to the embodiments of the present principles.

Referring now to FIG. 5, a schematic of an illustrative computing system is shown in accordance with the present principles. Computing system 500 is only one example of a suitable computing system and is not intended to suggest any limitation as to the scope of use or functionality of embodiments of the invention described herein. Regardless, computing system 500 is capable of being implemented and/or performing any of the functionality set forth hereinabove.

In computing system 500 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed network computing environments where tasks are performed by remote processing devices that are linked through a communications network.

As shown in FIG. 5, computer system/server 512 in computing system 500 is shown in the form of a general-purpose computing device. The components of computer system/server 512 may include, but are not limited to, one or more processors or processing units 616, a system memory 528, and a bus 518 that couples various system components including system memory 528 and processing units 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 858, such program modules 542 are by way of example, but not limited to, an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. These functions may include a degradation estimator 543, a timing delay estimator 544, a netlist generator 545 and a timing analyzer 546.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a wide area network (WAN), and/or a public network (e.g., the Internet) via network adapter 520. As depicted, network adapter 520 communicates with the other components of computer system/server 512 via bus 518. It should be understood that although not shown, other hardware and/or software modules could be used in conjunction with computer system/server 512. Examples, include, but are not limited to: microcode, device drivers, redundant processing units, external disk drive arrays, RAID systems, tape drives, and data archival storage systems, etc.

Having described preferred embodiments of a methodology and system for estimating delay degradation in integrated circuits due to device degradation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system for estimating delay deterioration in an integrated circuit comprising:
    a degradation estimator for estimating future degradation over each of one or more lifetimes in at least one characteristic of each device within the integrated circuit using voltages and logic values monitored during a simulation of the integrated circuit;
    a timing delay estimator for estimating change in timing delays for each of the one or more lifetimes of each device directly from each of the estimated degradations of the at least one characteristic of each device; and
    a timing analyzer for performing a timing analysis for each of the estimated changes in timing delay to determine circuit path delays over each of the one or more lifetimes.

2. The system of claim 1, wherein the at least one characteristic includes threshold-voltage as a function of at least one of a device's operating voltage, operating temperature, on and off duration times and transition slew.

3. The system of claim 1, wherein the change in timing delay is estimated using equation based fitting to map a device's timing delay to each of the estimated degradations.

4. The system of claim 1, further including a probability estimator for estimating the probability of failure of the integrated circuit over each of the one or more lifetimes for a given operating specification based on each of the determined circuit path delays.

5. The system of claim 1, wherein the simulation uses a specific pattern representative of a workload to be seen by the integrated circuit.

6. The computer readable storage medium of claim 1, wherein the timing analysis is static or statistical.

7. A non-transitory computer readable storage medium comprising a computer readable program for estimating delay deterioration in an integrated circuit, wherein the computer readable program when executed on a computer causes the computer to perform the steps of:
    estimating future degradation over each of one or more lifetimes in at least one characteristic of each device defined within the integrated circuit using voltages and logic values monitored during a simulation of the integrated circuit;
    estimating a change in timing delay for each of the one or more lifetimes of each device directly from each of the estimated degradations of the at least one characteristic of each device; and
    performing a timing analysis for each of the estimated changes in timing delay to determine circuit path delays over each of the one or more lifetimes.

8. The computer readable storage medium of claim 7, wherein the at least one characteristic includes threshold-voltage as a function of a device's operating voltage, operating temperature, on and off duration times and transition slew.

9. The computer readable storage medium of claim 7, wherein the change in timing delay is estimated using equation based fitting to map nominal timing delay to each of the estimated degradations.

10. The computer readable storage medium of claim 7, further including estimating the probability of failure of the integrated circuit over each of the one or more lifetimes for a given operating specification based on each of the determined circuit path delays.

* * * * *